United States Patent [19]

McEntyre

[11] 4,182,583

[45] Jan. 8, 1980

[54] UNDERGROUND PERCOLATION HEAD AND WATERING SYSTEM

[76] Inventor: Ralph McEntyre, 957 N. E. 145th St., North Miami, Fla. 33161

[21] Appl. No.: 933,200

[22] Filed: Aug. 14, 1978

[51] Int. Cl.² ............................................. E02B 13/00
[52] U.S. Cl. ........................................ 405/48; 239/542
[58] Field of Search ................ 405/36, 43, 46, 48, 405/51, 47, 49, 124, 126; 239/542

[56] References Cited

U.S. PATENT DOCUMENTS

| | | | |
|---|---|---|---|
| 953,080 | 3/1910 | Wiggins | 405/48 |
| 1,747,500 | 2/1930 | Butler | 405/47 |
| 2,366,522 | 1/1945 | Gutman | 405/46 |
| 3,874,598 | 4/1975 | Havens | 239/542 X |
| 3,896,999 | 7/1975 | Barragan | 239/542 X |
| 3,901,448 | 8/1975 | Babin | 405/51 X |

*Primary Examiner*—David H. Corbin

[57] ABSTRACT

This invention relates generally to underground irrigation systems and more specifically to the specific equipment required by such systems in the form of pipes, covers, valves and the like. This invention provides a means by which existing conventional surface sprinkling systems may be easily converted to the underground variety and a simplified inexpensive construction of an underground irrigation system.

6 Claims, 3 Drawing Figures

UNDERGROUND PERCOLATION HEAD AND WATERING SYSTEM

BACKGROUND OF THE INVENTION

1. Field of the Invention

This invention relates to irrigation systems in general and more specifically underground irrigation systems. Also included are the various devices which aid in the distribution of fluid throughout the system and in the percolation of water into the ground.

2. Description of the Prior Art Generally

Many underground water systems are revealed by the prior art which is typified by U.S. Pat. No. 3,426,544 by Curtis. Curtis reveals as most prior art systems do that first the water or other fluid such as liquid fertilizer and the like must first be conveyed to the various areas to be irrigated. This is usually accomplished by some pipe or duct system and constructed from all manner of material from concrete to plastic piping and the like. Once this step is accomplished, some distribution network for percolating the water into the surrounding ground must be developed. The percolating networks are essentially either porous watering heads or simply openings in the piping distribution lines. This invention is of an irrigation system and components for the same which include means to prevent the fouling of the water outflow openings with dirt and the like which results in far less expensive maintenance in order to keep the system operating efficiently. Further, the present invention is of a system which is relatively easy to install in the first instance and is of use in modifying existing surface watering systems to pure underground watering systems without wholesale removal of existing systems.

OBJECTS OF THE INVENTION

It is an object of this invention to provide a means for underground watering whereby the percolating irrigation openings are protected against becoming fouled or otherwise closed.

It is a further object of this invention to provide an underground watering system which need no periodic maintenance to continue operation.

It is a further object of this invention to provide an underground watering apparatus which allows easy conversion of existing surface watering systems to underground systems.

It is a final object of this invention to provide a simplified underground watering system that can be installed by unskilled workmen and is of minimal cost.

SUMMARY OF THE INVENTION

Figure 1:
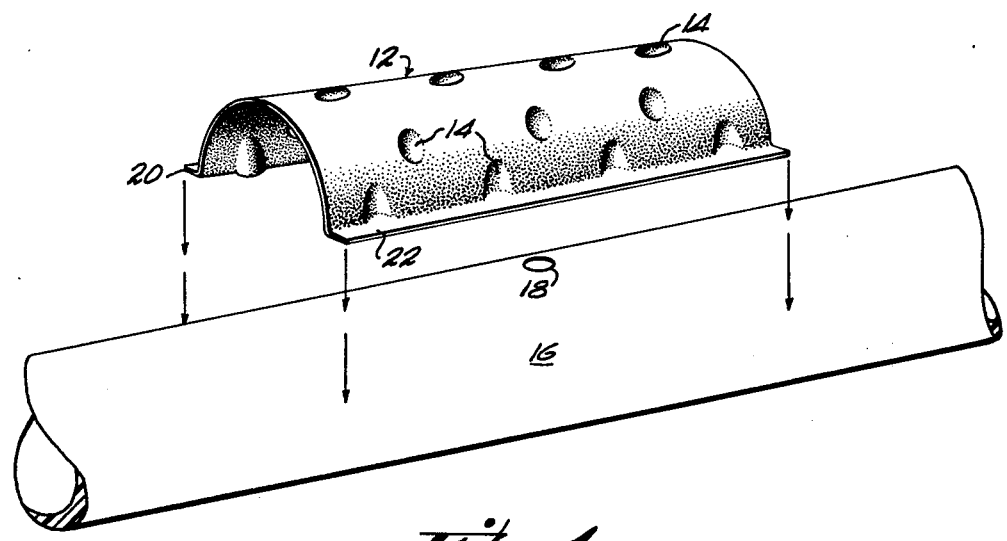
FIG. 1 is an exploded perspective view of the components of the system of the instant invention.

This invention is of a simplified percolation head which is sized and configured to mate with and protect an opening on distribution lines from clogging. One of the heads is positioned over each of the openings in the top surface of a distribution pipe for the purposes to be described more fully hereinafter.

The percolation head is essentially a cover spaced apart from and sized to mate with the upper surface of an underground water distribution pipe through which a hole is provided, the hole being one of a plurality of holes along the upper surface of the pipe for releasing the water. Since, when mated with a pipe and over an opening in it, the entire lower half of the head, that is between the outer surface of the pipe and the inner surface of the percolation head, there is an enlarged space open to the ground through which water is allowed to directly percolate into the ground about the pipe and head, although the actual opening for the water is not in direct contact with the ground. Therefore, no dirt or the like will clog the opening. Further existing sprinkler systems having underground pipes but sprinkler heads above the ground can be easily converted to a totally underground system by simply removing the existing head and placing the percolating head central of the exposed opening in the distribution pipe and then burying the same. This preserves water and prevents evaporation and run-off before the water percolates downward to the roots where it is needed.

DESCRIPTION OF THE PREFERRED EMBODIMENT

With reference to the drawings, the numeral 12 generally designates a semicircular cross section percolation head which is longitudinally elongated and which is formed so as to be semicircular in configuration as seen in cross section. Spaced longitudinally and peripherally about the surface of the circular portion of the head 12 is a pattern in relief defining a plurality of indentations 14 which cause corresponding protrusions about the inner surface of the head for spacing the head apart from the distribution pipe 16 which has a hole 18 in it, the hole being one of a series along the upper surface of the pipe. Along each side of said head 12 are flanges 20 and 22. The flanges 20 and 22 prevent the rotational motion of the head 12 circumferentially about the pipe 16 due either to earth motion or percolation of rain, water and the like.

Figure 2:
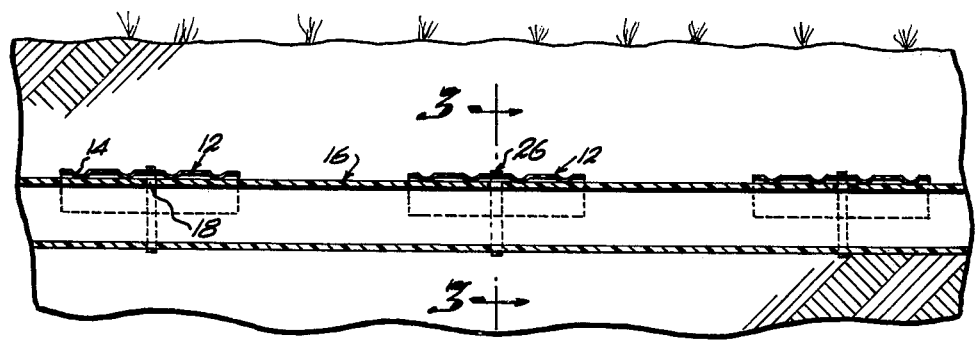
FIG. 2 is a side elevation view in cross section illustrating the components of the instant invention installed in a water irrigation system.

Accordingly, when one wishes to install an underground irrigation system, he simply lays ordinary PVC pipe 16 below ground level. He then drills or otherwise places a series of holes along the length thereof, such as the hole designated by the numeral 18. Centrally over each hole he places a percolation head 12 which is sized and configured to mate in accordance with the illustration shown in FIGS. 2 and 3. Once the installer is satisfied that the protrusions or indentations 14 are not registered with hole 18, for example, the entire struture may be buried. In operation, the water flows out of each hole, such as the hole 18, into the space between the pipe 16 and the head 12 and percolates outwardly from each end of the pipe and downwardly and away from the flanges 20 and 22. Dirt cannot foul the system because it itself is the percolating substance.

Figure 3:
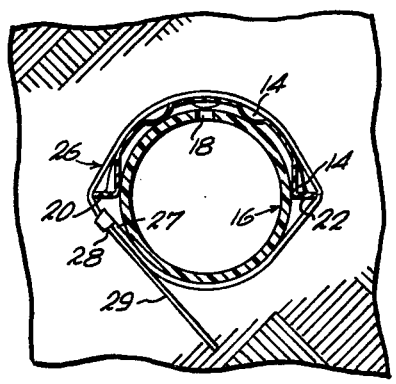
FIG. 3 is an end view of a distribution pipe and percolation head in cross section taken on the plane indicated by the line 3—3 of FIG. 2 and looking in the direction of the arrows.

In the preferred embodiment ties 26 in the form of strips of bendable pliable material, such as plastic, may be used as keepers, with one end 27 having an opening as at 28 through which the other end 29 is passed and drawn tight, see FIG. 3.

The foregoing is considered illustrative only of the principles and specific embodiment of the invention. Further, since numerous modifications and changes will readily occur to those skilled in the art, it is not intended to limit the invention to strictly that described herein but such is to include all modifications and equivalents falling within the scope of the invention herein claimed.

It is thus seen that there is provided a plurality of components for an irrigation system which includes a plurality of pipes defining a network and wherein the pipes are provided with spaced holes in their upper surfaces, the holes being spaced about four feet apart. The plastic shield or percolation head covers the top half of the pipes and is in spaced relation therefrom because of the inwardly directed dimples. The shields are held by the pipes in spaced apart relation by self-locking straps in a preferred installation. Water flowing from the spaced pipe holes is confined to a path defined by the space between the top half of the pipe and the inner surface of the shield for even distribution from the openings along the shield sides. It is thus seen that the devices of the instant system may be installed in an existing underground pipe system or inserted as a new system with holes being provided in PVC pipe, for example, which is planted about four inches underground in a preferred installation.

The water feeding pipe may be of metal, PVC or any other suitable material and it may be between two and eight inches below the surface for some types of irrigation depending upon the plants which are being irrigated. The holes along the pipe may be made with a suitable drill about 3/16 inches in diameter. The holes may be suitably spaced apart, for example, in a preferred embodiment, four feet is satisfactory. Each is covered by one of the dimpled covers, shields or percolation heads. The dimpled covers placed over the holes in the pipe are preferably between three and six inches in longitudinal length. In a preferred installation, the longitudinal length is five inches. The thickness of the heads may be as desired, it being noted that by reason of their configuration the same are not readily deformable. In a preferred embodiment, about 1/16 of an inch thickness for the percolation heads is satisfactory; however, the thickness may be substantially less or substantially more so long as the shields which are of rigid plastic material in a preferred embodiment are not deformed so as to cover the openings of the pipe. It is thus seen that there is provided a self-cleaning type of system since the water outflow is always away from the openings avoiding the need of filters, etc. with the result that less water may be utilized in watering a given irrigated area using the instant system since all of the water is directed to percolate into the ground without evaporation losses as in the case of overhead sprinkler systems.

What is claimed is:

1. A percolation head for covering a hole in an irrigation pipe of circular cross section having an upper surface and side surfaces to be covered by earth and a bottom surface to rest on the earth in a shallow trough and in which the hole is one of a series provided in the upper surface, said head comprising:

(A) an elongated generally semi-circular member of a radius of curvature larger than the radius of curvature of said cylindrical pipe, said member having an inside main surface of a predetermined relatively large area sized to cover the upper and a portion of the side surfaces of the pipe and to extend longitudinally of the pipe a substantial distance on opposite sides of the hole, said inside surface having curved end edges and parallel side edges and having a pattern in relief on the inside surface, said pattern in relief comprising a plurality of spaced protrusions, each protrusion having a terminal end zone of relatively small area relative to said predetermined area of said inside main surface, said protrusions being spaced from one another and being of a common predetermined height, said pattern extending from edge to edge substantially over the inside surface, (B) said member being sized to cradle the upper and a portion of the side surfaces of said pipe about said hole, with said protrusions comprising:

(a) spacer means to space the inside surface of the elongate member radially with respect to the pipe surface about the hole defining a water flow path, and (b) baffle means extending between the pipe surface and the inside main surface of said elongate member about which water flowing in the path is constrained to be diverted in passing through the water flow path;

(C) the sum of the areas of the terminal end zones of said protrusions in engagement with the pipe being substantially less than the area of the inside surface of the elongate member;

(D) said waterflow path being relatively large and relatively unobstructed and through which water must flow in a curving path by reason of said baffling means thereacross.

2. A percolation head as described in claim 1 wherein said elongated member is semicylindrical in shape.

3. A percolation head as described in claim 2 wherein said pattern in relief comprises a plurality of convex protrusions about the inner surface of said member.

4. The device as set forth in claim 1 wherein said member is provided with a pair of radially outwardly extending flanges on the longitudinally extending terminal edges of said member.

5. A percolation head as set forth in claim 1 in combination with a plurality of similarly configured heads and a pipe wherein said pipe includes a plurality of openings spaced from one another in the upper surface thereof and one of said heads is positioned centrally above each of said openings.

6. The device as set forth in claim 1 wherein said protrusions are arranged in circumferentially spaced longitudinally extending rows and the protrusions of each row are staggered with respect to the protrusions of adjacent rows.

* * * * *